(12) United States Patent
Kim et al.

(10) Patent No.: US 11,561,518 B2
(45) Date of Patent: Jan. 24, 2023

(54) ELECTRONIC APPARATUS AND CONTROL METHOD THEREOF

(71) Applicant: SAMSUNG ELECTRONICS CO., LTD., Suwon-si (KR)

(72) Inventors: Jaewook Kim, Suwon-si (KR); Youngjun Kim, Suwon-si (KR); Doheum Park, Suwon-si (KR); Yeongtae Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/317,572

(22) Filed: May 11, 2021

(65) Prior Publication Data

US 2021/0373514 A1 Dec. 2, 2021

(30) Foreign Application Priority Data

May 27, 2020 (KR) .................. 10-2020-0063406

(51) Int. Cl.
  *G06F 11/30* (2006.01)
  *G05B 13/04* (2006.01)
(52) U.S. Cl.
  CPC ................ *G05B 13/048* (2013.01)
(58) Field of Classification Search
  CPC .................................................. G05B 13/048
  See application file for complete search history.

(56) References Cited

U.S. PATENT DOCUMENTS

2019/0369963 A1* 12/2019 Utsumi ............... H02J 13/00

FOREIGN PATENT DOCUMENTS

| JP | 9-179850 A | 7/1997 |
|---|---|---|
| JP | 2001-167203 A | 6/2001 |
| JP | 2018-92439 A | 6/2018 |
| KR | 10-2000-0056762 A | 9/2000 |
| KR | 10-1725011 B1 | 4/2017 |
| KR | 10-1725013 B1 | 4/2017 |
| KR | 10-1725014 B1 | 4/2017 |
| KR | 10-1725015 B1 | 4/2017 |
| KR | 10-2065780 B1 | 1/2020 |
| WO | 2014/025188 A1 | 2/2014 |

OTHER PUBLICATIONS

International Search Report & Written Opinion (PCT/ISA/210 & PCT/ISA/237) dated Sep. 16, 2021 by the International Searching Authority in International Application No. PCT/KR2021/006281.

* cited by examiner

*Primary Examiner* — Phuong Huynh
(74) *Attorney, Agent, or Firm* — Sughrue Mion, PLLC

(57) ABSTRACT

An electronic apparatus and a control method thereof are provided. The electronic apparatus may include an interface; and a processor configured to obtain, via the interface, information related to values, which occur in time series, of a plurality of factors regarding a prediction object, identify, based on the information related to the values of the plurality of factors, at least one factor, from among the plurality of factors, having a time series change of values that corresponds to a time series change of reference values of the prediction object, and output information related to a predicted value of the prediction object based on the time series change of the values of the at least one factor.

15 Claims, 10 Drawing Sheets

FIG. 10

| | | DIFFERENCE BETWEEN TIME(POINT) AT WHICH PREDICTION IS PERFORMED AND CHANGE POINT | | | |
|---|---|---|---|---|---|
| | | -3 | -2 | -1 | 0 |
| DIFFERENCE BETWEEN PREDICTED POINT AND ACTUAL CHANGE POINT | 0 | X_03 | X_02 | X_01 | X_00 |
| | ±1 | X_13 | X_12 | X_11 | X_10 |
| | ±2 | X_23 | X_22 | X_21 | X_20 |

1000

ELECTRONIC APPARATUS AND CONTROL METHOD THEREOF

CROSS-REFERENCE TO RELATED APPLICATION(S)

This application is based on and claims priority under 35 U.S.C. § 119 to Korean Patent Application No. 10-2020-0063406, filed on May 27, 2020, in the Korean Intellectual Property Office, the disclosure of which is incorporated by reference herein in its entirety.

BACKGROUND

1. Field

The disclosure relates to an electronic apparatus and a control method thereof which predicts and calculates a value of an object to be predicted.

2. Description of Related Art

Although a simple linear regression of factors which have a rational causal relationship can be used to predict a value of an object to be predicted, it becomes more important to select a significant factor as a type and volume of data become larger.

As a method of selecting the factor, for example, a forward selection, which selects a factor of high significance using linear relation between the factors, a backward elimination, which eliminates a factor of low significance, etc., are used. Another method is used to make a set of factors which have no multicollinearity by classifying a plurality of principal components using variance or covariance relation between the factors and forming new factors through a linear combination of the factors which are included in the classification of each principal component.

However, because such methods of selecting the factors have references only to the value itself based on a difference between a predicted value and an actual value, a ratio, etc., and calculate only a relation index between individual factors and corresponding values, there is a problem where an interaction effect between the individual factors which are not considered cannot be applied. Also, there is another problem where explanatory power decreases as a factor which has no relation with the object to be predicted is selected.

SUMMARY

Provided are an electronic apparatus and a control method thereof which more accurately predict a value of an object to be predicted.

According to an aspect of the disclosure, an electronic apparatus may include an interface; and a processor configured to obtain, via the interface, information related to values, which occur in time series, of a plurality of factors regarding a prediction object, identify, based on the information related to the values of the plurality of factors, at least one factor, from among the plurality of factors, having a time series change of values that corresponds to a time series change of reference values of the prediction object, and output information related to a predicted value of the prediction object based on the time series change of the values of the at least one factor.

The processor may identify a point at which the values of the plurality of factors change in time series from increasing to decreasing or change in time series from decreasing to increasing, and identify the at least one factor based on the point.

The point may be a first point, and the processor may identify the at least one factor based on a relation between a number of first points and a number of second points at which the reference values change in time series from increasing to decreasing or change in time series from decreasing to increasing.

The processor may determine a probability of each of the plurality of factors according to a precedence degree and an accuracy which are predicted from the values of the plurality of factors, and determine a prediction validity of each of the plurality of factors based on the corresponding probability.

The processor may identify an increase or a decrease of the time series change of the values of the plurality of factors based on the information related to the values of the plurality of factors, and identify the at least one factor based on the increase or the decrease of the time series change.

The processor may group the plurality of factors into a plurality of groups which are different from one another based on a relation to the prediction object, and identify the at least one factor based on changes of values of the plurality of factors which are included in the plurality of groups.

The processor may determine coordinates for each of the plurality of factors according to the relation, and group factors, from among the plurality of factors, having similar coordinates into a same group.

The processor may identify the at least one factor based on values of factors which have representativeness in each of the plurality of groups.

The processor may identify whether a time series change of values of a combination of factors of the plurality of factors, which are selected from the plurality of groups, corresponds to the time series change of the reference values.

According to an aspect of the disclosure, a method of controlling an electronic apparatus may include obtaining, via an interface, information related to values, which occur in time series, of a plurality of factors regarding a prediction object, identifying, based on the information related to the values of the plurality of factors, at least one factor, from among the plurality of factors, having a time series change of values that corresponds to a time series change of reference values of the prediction object, and outputting information related to a predicted value of the prediction object based on the time series change of the values of the at least one factor.

The method may include identifying a point at which the values of the plurality of factors change in time series from increasing to decreasing or change in time series from decreasing to increasing, and identifying the at least one factor based on the point.

The point is a first point, and the identifying the at least one factor may include identifying the at least one factor based on a relation between a number of first points and a number of second points at which the reference values change in time series from increasing to decreasing or change in time series from decreasing to increasing.

The identifying the at least one factor may include determining a probability of each of the plurality of factors according to a precedence degree and an accuracy which are predicted from the values of the plurality of factors, and determining a prediction validity of each of the plurality of factors based on the corresponding probability.

The identifying the at least one factor may include identifying an increase or a decrease of the time series change of the values of the plurality of factors based on the information related to the values of the plurality of factors, and identifying the at least one factor based on the increase or the decrease of the time series change.

The identifying the at least one factor may include grouping the plurality of factors into a plurality of groups which are different from one another based on a relation to the prediction object, and identifying the at least one factor based on changes of values of the plurality of factors which are included in the plurality of groups.

The grouping the plurality of factors into the plurality of groups may include determining coordinates for each of the plurality of factors according to the relation, and grouping factors, from among the plurality of factors, having similar coordinates into a same group.

The identifying the at least one factor may include identifying the at least one factor based on values of factors which have representativeness in each of the plurality of groups.

The identifying the at least one factor may include identifying whether a time series change of values of a combination factors of the plurality of factors, which are selected from the plurality of groups, corresponds to the time series change of the reference values.

A non-transitory computer-readable medium may store a computer program including computer-readable code to perform a method of controlling an electronic apparatus. The method may include obtaining, via an interface, information related to values, which occur in time series, of a plurality of factors regarding a prediction object, identifying, based on the information related to the values of the plurality of factors, at least one factor, from among the plurality of factors, having a time series change of values that corresponds to a time series change of reference values of the prediction object, and outputting information related to a predicted value of the prediction object based on the time series change of the values of the at least one factor.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 illustrates a table used for the precedence prediction index.

DETAILED DESCRIPTION

Figure 1:
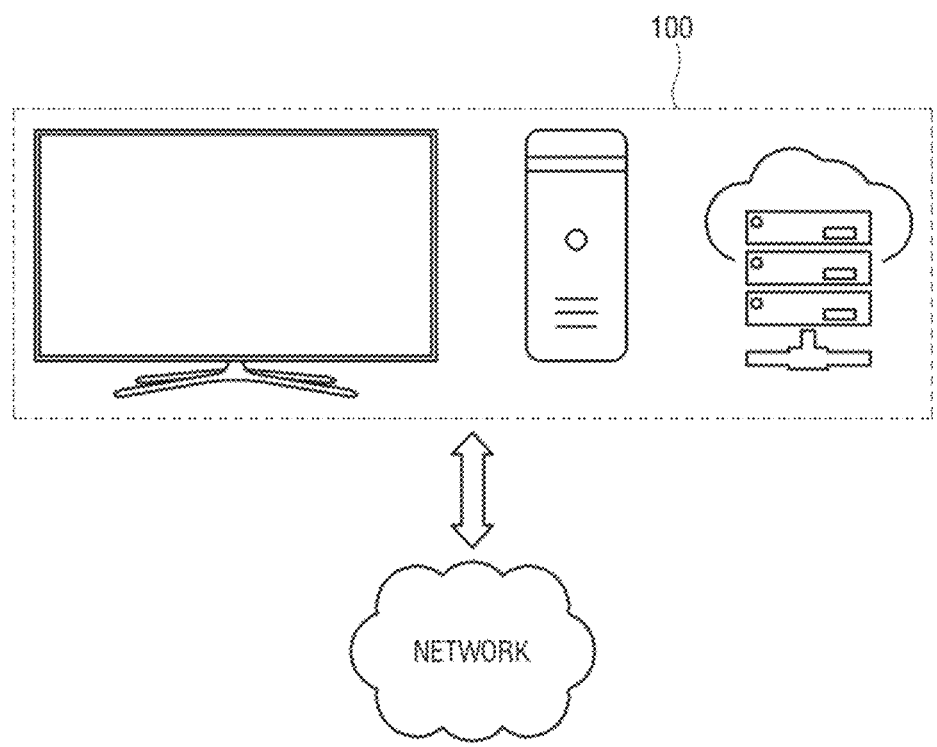
FIG. 1 illustrates an electronic apparatus according to an example embodiment.

Hereinafter, embodiments of the disclosure will be described in detail with reference to the accompanying drawings. In the drawings, the same reference numbers or signs refer to components that perform substantially the same function, and the size of each component in the drawings may be exaggerated for clarity and convenience. However, the technical idea and the core configuration and operation of the disclosure are not limited only to the configuration or operation described in the following examples. In describing the disclosure, if it is determined that a detailed description of the known technology or configuration related to the disclosure may unnecessarily obscure the subject matter of the disclosure, the detailed description thereof will be omitted.

In the description of the embodiments, terms including ordinal numbers such as "first" and "second" are used only for the purpose of distinguishing one component from other components, and singular expressions include plural expressions unless the context clearly indicates otherwise. Also, in the description of the embodiments, it should be understood that terms such as "configured," "include," and "have" do not preclude the existence or addition possibility of one or more other features or numbers, steps, operations, components, parts, or combinations thereof. In addition, in the description of the embodiments, a "module" or a "unit" performs at least one function or operation, and may be implemented in hardware or software, or a combination of hardware and software, and may be integrated into at least one module. In addition, in the description of the embodiments, at least one of the plurality of elements refers to not only all of the plurality of elements, but also each one or all combinations thereof excluding the rest of the plurality of elements.

FIG. 1 illustrates an electronic apparatus according to an example embodiment.

The electronic apparatus 100 which outputs information on a predicted value of a prediction object according to an example embodiment may be embodied in various ways. Accordingly, as illustrated in FIG. 1, the electronic apparatus 100 may be embodied as, for example, a computer, a server, a display apparatus, etc. Also, the electronic apparatus 100 may be embodied as a recording medium which stores a computer program including computer-readable code to perform a method of controlling the electronic apparatus.

The electronic apparatus 100 obtains information on a plurality of factors regarding a prediction object, and, through a process, outputs information on a predicted value based on the obtained information. The prediction object may be an object for which a value or figure is to be predicted such as, for example, a price of a panel of a display apparatus. The plurality of factors regarding the prediction object may be factors which relate to the prediction object and provides data as a basis of calculating a value of the prediction object such as, for example, a past material price, a stock price, an economic indicator, a demand for the panel, etc.

The electronic apparatus 100 according to an embodiment does not only consider an error between the predicted value and a reference value which is an actual value, but also selects a combination of optimal factors based on values, which occur in time series, of the plurality of factors. Here, a trend of change of the values may be more important than a trend of the values hereafter in prediction using time series change of the factors. Therefore, in order to detect a pattern of the change, it is possible to perform prediction based on an index which emphasizes a necessary (or important) feature of the object to be predicted from the combined factors. Such prediction may minimize an absolute error between the predicted value and the reference value and allow the predicted value to be achieved in accordance with the pattern of actual time series, which may be substantially used in making a decision afterwards based the prediction.

Therefore, in selecting the factor and a model regarding the prediction object to calculate the predicted value of the prediction object more accurately, a solution that the electronic apparatus 100 according to an embodiment uses a prediction index which is suitable for a necessary (or important) condition of prediction results and a time series model will be suggested below.

Figure 2:
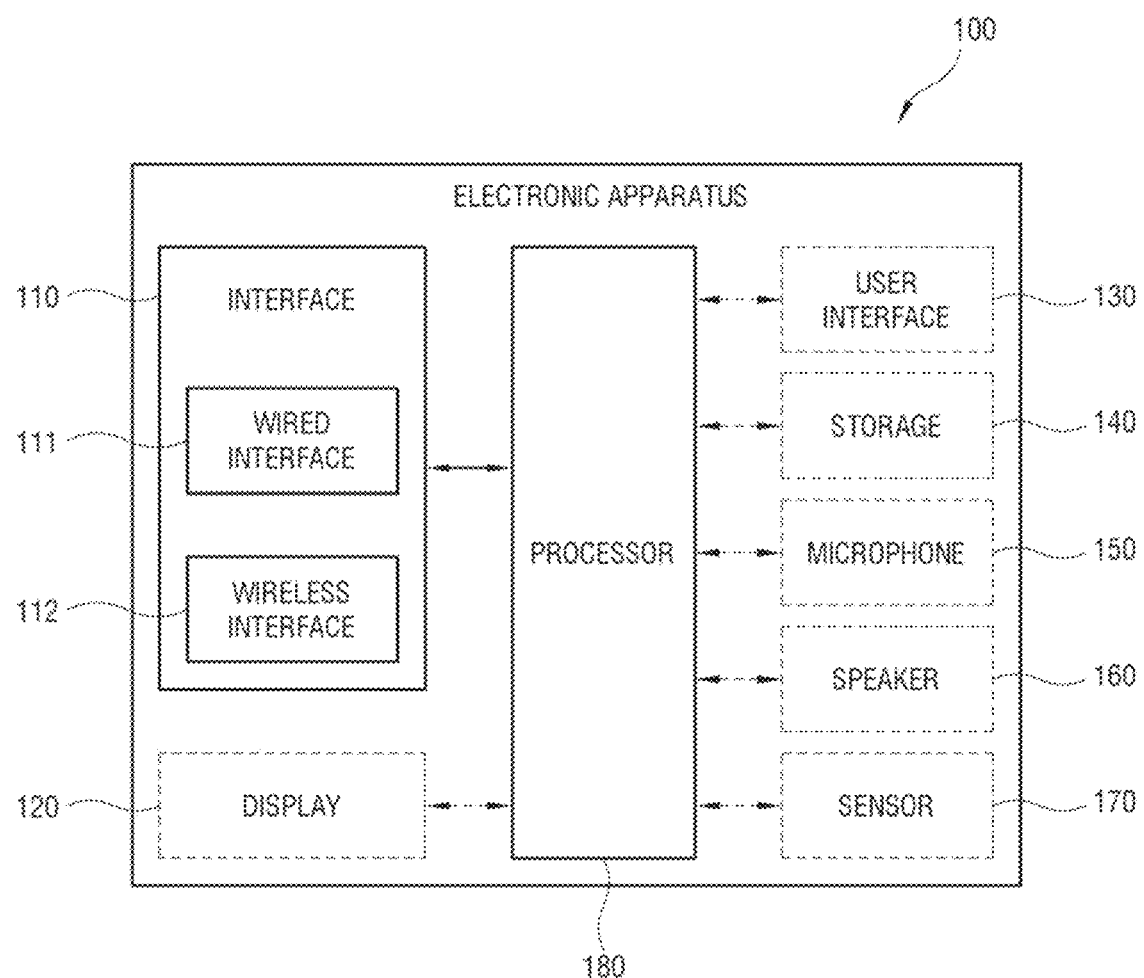
FIG. 2 is a block diagram illustrating configurations of the electronic apparatus according to an example embodiment.

FIG. 2 is a block diagram illustrating configurations of the electronic apparatus according to an embodiment.

As illustrated in FIG. 2, the electronic apparatus 100 includes an interface 110. The electronic apparatus 100 obtains, through the interface 110, information on or related to values, which occurred in the past in time series at a plurality of points, of the plurality of factors regarding the prediction object.

The interface 110 includes a wired interface 111. The wired interface 111 may include a connector or port to which an antenna for receiving a broadcast signal based on broadcasting standards for terrestrial/satellite broadcasting, etc., is connected or to which a cable for receiving a broadcast signal based on cable broadcasting standards is connected. Alternatively, the electronic apparatus 100 may include a built-in antenna to receive a broadcast signal. The wired interface 111 may include a connector, a port, etc., such as a high definition multimedia interface (HDMI) port, a DisplayPort, a DVI port, and the like, based on video and/or audio transmission standards such as thunderbolt, composite video, component video, super video, Syndicat des Constructeurs d'Appareils Radiorécepteurs et Téléviseurs (SCART), etc. The wired interface 111 may include a connector, port, etc., based on universal data transmission standards such as a universal serial bus (USB) port. The wired interface 111 may include a connector, a port, etc., to which an optical cable based on optical transmission standards is connected. The wired interface 111 may include a connector, a port, etc., which connects with an external microphone or an external audio device including a microphone, and receives an audio signal from the audio device. The wired interface 111 may include a connector, a port, etc., which connects with an audio device such as a headset, an earphone, an external loudspeaker, etc., and transmits or outputs an audio signal to the audio device. The wired interface 111 may include a connector, a port, etc., based on Ethernet, or the like, network transmission standards. For example, the wired interface 111 may be embodied by a local area network (LAN) card, or the like, connected to a router or gateway by a wire.

The wired interface 111 may be connected to a set-top box, an optical media player, a loudspeaker, a server, etc., in a manner of 1:1 or 1:N (where N is a natural number) through the foregoing connectors, ports, etc., by a wire, thereby receiving a video/audio signal from the connected external device or transmitting a video/audio signal to the connected external device. The wired interface 111 may include connectors, ports, etc., to transmit the video/audio signals individually.

Further, according to this example embodiment, the wired interface 111 may be internally provided in the electronic apparatus 100, or may be detachably connected to the connector of the electronic apparatus 100 as provided in the form of a dongle or module.

The interface 110 may include a wireless interface 112. The wireless interface 112 may be variously embodied corresponding to the electronic apparatus 100. For example, the wireless interface 112 may use wireless communication methods such as radio frequency (RF), Zigbee, Bluetooth, wireless fidelity (Wi-Fi), Wi-Fi Direct (WFD), ultra wideband (UWB), near field communication (NFC), etc. The wireless interface 112 may be embodied by a wireless communication module based on Wi-Fi, Bluetooth, or the like, for one-to-one direct wireless communication. The wireless interface 112 performs wireless communication with a server via a network, thereby exchanging a data packet with the server. The wireless interface 112 may include an infrared (IR) transmitter and/or an IR receiver to transmit and/or receive an IR signal based on IR communication standards. Through the IR transmitter and/or the IR receiver, the wireless interface 112 may receive or input therein a remote control signal from a remote controller or another external device, or transmit or output the remote control signal to another external device. Alternatively, the electronic apparatus 100 may exchange the remote control signal with the remote controller or other external devices through the wireless interface 112 of different standards such as Wi-Fi, Bluetooth, etc.

When the video/audio signal received through the interface 110 is a broadcast signal, the electronic apparatus 100 may further include a tuner to be tuned to a channel for the received broadcast signal.

The electronic apparatus 100 may include a display 120. The display 120 includes a display panel configured to display an image on a screen. The display panel is provided to have a light receiving structure such as a liquid crystal type, or a self-emissive structure such as an organic light emitting diode (OLED) type. The display 120 may include an additional element according to the structure of the display panel. For example, when the display panel is the liquid crystal type, the display 120 includes a liquid crystal display panel, a backlight unit configured to emit light, and a panel driving substrate configured to drive liquid crystal of the liquid crystal display panel.

The electronic apparatus 100 may include a user interface 130. The user interface 130 includes circuitry related to various input interfaces provided to receive a user input. The user interface 130 may be variously configured according to the kinds of the electronic apparatus 100, and may, for example, include a mechanical or electronic button of the electronic apparatus 100, a remote controller separated from the electronic apparatus 100, an input interface provided in an external device connected to the electronic apparatus 100, a touch pad, a touch screen installed in the display 120, etc.

The electronic apparatus 100 may include a storage 140. The storage 140 is configured to store digitalized data. The storage 140 includes a nonvolatile storage in which data is retained regardless of whether power is on or off, and a volatile memory into which data to be processed by a processor 180 is loaded and in which data is retained only when power is on. The storage 140 includes a flash memory, a hard-disc drive (HDD), a solid-state drive (SSD), a read only memory (ROM), etc., and the memory includes a buffer, a random-access memory (RAM), etc.

The electronic apparatus 100 may include a microphone 150. The microphone 150 collects a voice of a user, and the like, sounds from external environments, etc. The microphone 150 transmits a signal based on a collected sound to the processor 180. The electronic apparatus 100 may include the microphone 150 for collecting a voice of a user, or receiving an audio signal from an external apparatus having a microphone such as the remote controller, the smartphone, or the like, through the interface 110. The external apparatus may be installed with a remote-control application to control the electronic apparatus 100 or perform voice recognition or a similar function. With such an installed application, the external apparatus may receive a voice of a user, exchange data and control with the electronic apparatus 100 through Wi-Fi, Bluetooth, IR, etc., where a plurality of interfaces 110 corresponding to the communication methods may be present in the electronic apparatus 100.

The electronic apparatus 100 may include a speaker 160. The speaker 160 outputs a sound based on audio data processed by the processor 180. The speaker 160 includes a unit speaker provided corresponding to audio data of a certain audio channel, and thus may include a plurality of unit speakers respectively corresponding to the audio data of the plurality of audio channels. According to another example embodiment, the speaker 160 may be provided separately from the electronic apparatus 100, and the electronic apparatus 100 in this case may transmit the audio data to the speaker 160 through the interface 110.

The electronic apparatus 100 may include a sensor 170. The sensor 170 senses a state of the electronic apparatus 100 and forwards information on the sensed state to the processor 180. The sensor 170 includes at least one of a magnetic sensor, an acceleration sensor, a temperature/humidity sensor, an infrared sensor, a gyro sensor, a position sensor such as a GPS sensor, an atmospheric pressure sensor, a proximity sensor, an illuminance sensor such as an RGB sensor, etc., but is not limited thereto. The processor 180 may store a sensing value in the storage 140. Based on a user event being detected, the processor 180 may identify whether the user event occurs based on whether a detected sensing value corresponds to the stored sensing value.

The electronic apparatus 100 includes the processor 180. The processor 180 includes one or more hardware processors embodied as a central processing unit (CPU), a chipset, a buffer, a circuit, etc., which are mounted onto a printed circuit board, and may be embodied as a system on chip (SoC). When the electronic apparatus 100 is embodied as a display apparatus, the processor 180 includes modules corresponding to various processes, such as a demultiplexer, a decoder, a scaler, an audio digital signal processor (DSP), an amplifier, etc. Here, some or all of such modules may be embodied as an SOC. For example, video processing modules such as the demultiplexer, the decoder, the scaler, and the like, may be embodied as a video processing SOC, and the audio DSP may be embodied as a chipset separately from the SOC.

The processor 180 may convert an audio signal into audio data based on the audio signal related to a voice of a user being obtained via the microphone 150, or the like. In this case, the audio data may include text data obtained by a speech-to-text (STT) process that converts an audio signal into text data. The processor 180 identifies a command issued by the audio data, and performs an operation based on the identified command. Both the process for the audio data and the process for the command may be performed in the electronic apparatus 100. Alternatively, at least some processes may be performed by at least one server connected to and communicating with the electronic apparatus 100 via a network, thereby conserving processor and memory resources of the electronic apparatus 100.

The processor 180 may call and execute at least one instruction among one or more software instructions stored in a computer-readable storage medium which is readable by the electronic apparatus 100, or the like. This enables the electronic apparatus 100 to operate and perform at least one function based on the at least one called instruction. The one or more instructions may include code produced by a compiler or a code executable by an interpreter. The computer-readable storage medium may be provided in the form of a non-transitory storage medium. Here, "non-transitory" refers to the storage medium being a tangible device, and the term does not distinguish between cases of code or data being semi-permanently and temporarily stored in the storage.

The processor 180 may use at least one of a machine learning, neural network, or deep learning algorithm as a rule-base or artificial intelligence (AI) algorithm to perform at least a part of data analysis, processing, or result information generation for obtaining, via the interface 110, information related to values, which occur in time series, of the plurality of factors regarding the prediction object, identifying at least one factor from among the plurality of factors, where time series change of the values of the identified at least one factor corresponds to time series change of reference values which are provided for the prediction object, and outputting information on a predicted value of the prediction object based on the values of the identified at least one factor.

The processor 180 may perform a preprocess and a conversion of the plurality of factors or the values of the plurality of factors occurring in time series to have a form which is suitable for an input to an AI model. The AI model may be achieved through learning. Here, the achievement through learning means that the AI model, that is, a predefined operation rule which is set to perform a feature or purpose to be desired is achieved by allowing a basic AI model to learn using a plurality of pieces of learning data through a learning algorithm. The AI model may include a plurality of neural networks. Each layer of the plurality of neural networks has a plurality of weight values and performs a neural network arithmetic operation through an operation between an operation result of a previous layer and the plurality of weight values.

Inference prediction is a technique to infer logically and predict by judging information and includes knowledge/probability-based reasoning, optimization prediction, preference-based planning, recommendation, etc.

For example, the processor 180 may function as both a learner and a recognizer. The learner may perform a function of generating the learned neural network, and the recognizer may perform a function of recognizing (or inferring, predicting, estimating, and identifying) the data based on the learned neural network. The learner may generate or update the neural network. The learner may obtain learning data to generate the neural network. For example, the learner may obtain the learning data from the storage 140 or from an external source. The learning data may be data used for learning the neural network, and the data subjected to the foregoing operations may be used as the learning data to teach the neural network.

Before teaching the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data for generating the neural network set to perform the operations.

The learned neural network may include a plurality of neural networks (or layers). The nodes of the plurality of neural networks have weights, and the plurality of neural networks may be connected to one another so that an output value of a certain neural network can be used as an input value of another neural network. The neural network may be a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-networks, or the like.

The recognizer may obtain target data to perform the foregoing operations. The target data may be obtained from the storage 140 or from an external source. The target data may be data targeted for recognition of the neural network. Before applying the target data to the learned neural network, the recognizer may preprocess the obtained target data or select data to be used in the recognition among a plurality of pieces of target data. For example, the recognizer may process the target data to have a preset format, apply filtering to the target data, or add/remove noise to/from the target data, thereby processing the target data into data suitable for recognition. The recognizer applies the preprocessed target data to the neural network, thereby obtaining an output value output from the neural network. The recognizer may obtain a probability value or a reliability value together with the output value.

The control method of the electronic apparatus 100 may be provided in a computer program product. The computer program product may include software instructions to be executed by the processor 180 as described above. The computer program product may be traded as a commodity between a seller and a buyer. The computer program product may be distributed in the form of a computer-readable storage medium (e.g., a compact disc read only memory (CD-ROM)) or may be directly distributed or distributed online (e.g., downloaded or uploaded) between two user apparatuses (e.g., smartphones) via an application store (e.g., Play Store™). In the case of online distribution, at least a part of the computer program product may be stored or produced in a computer-readable storage medium such as a memory of a manufacturer server, an application-store server, or a relay server.

Figure 3:
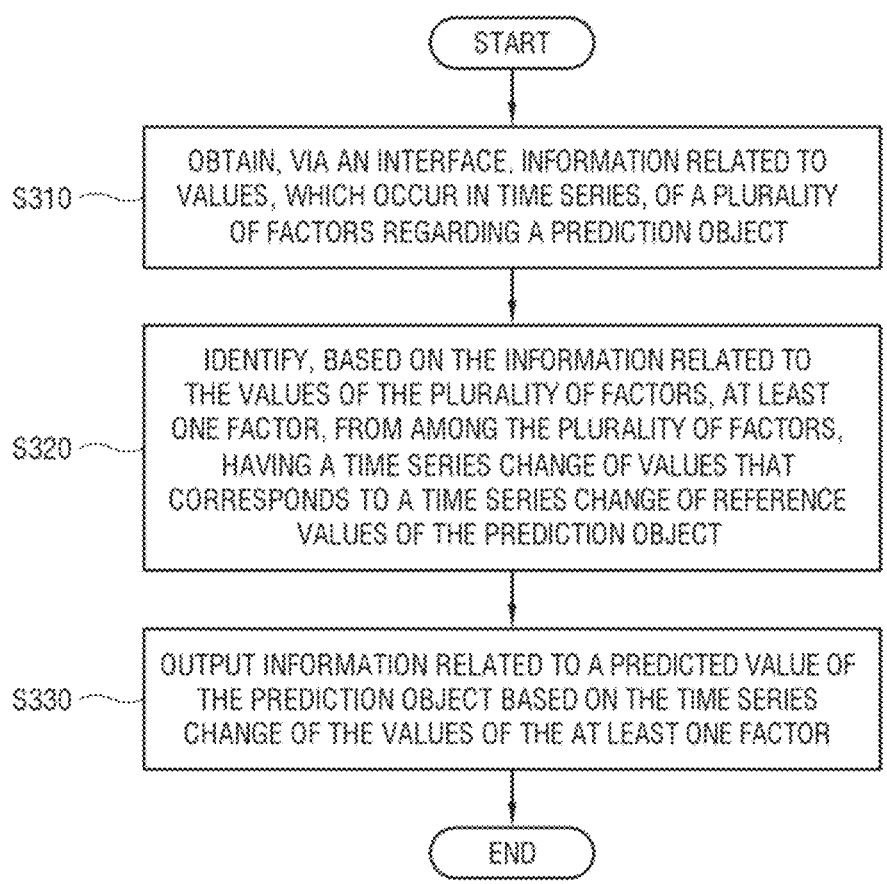
FIG. 3 is a flowchart illustrating operations of the electronic apparatus according to an example embodiment.

FIG. 3 is a flowchart illustrating operations of the electronic apparatus 100 according to an example embodiment.

According to an example embodiment, the processor 180 obtains, via the interface 110, information related to values, which occur in time series, of the plurality of factors regarding the prediction object (operation S310). The processor 180 may receive data via the interface 110 or use data stored in the storage 140 to extract a new factor which relates to the prediction object. The data may be provided in advance or may be updated periodically. Therefore, the processor 180 extracts the plurality of factors from the data relating to the prediction object, and obtains the information related to the values of the extracted plurality of factors occurring in time series. The operation of extracting the plurality of factors will be described in detail elsewhere herein.

The processor 180 identifies at least one factor, among the plurality of factors, where time series change of the values of the identified at least one factor corresponds to time series change of reference values which are provided for the prediction object (operation S320).

According to an embodiment, when extracting the plurality of factors relating to the prediction object for calculating the values of the prediction object as described above, the processor 180 may also identify an optimal factor whose values corresponding to the reference values can be calculated accurately. The processor 180 may operate based on an accuracy index which is set for operating in consideration of a time series feature of every predicted value as well as accuracy of the values in a prediction interval. That is, the processor 180 may identify the at least one factor, among the plurality of factors, where the time series change of the values of the identified at least one factor corresponds to the time series change of the reference values which are provided for the prediction object. The reference values may be actual values which occurred at a past point for the prediction object.

The processor 180 may, using the accuracy index, identify whether the time series change of the values of each factor corresponds to the time series change of the reference values. The accuracy index used in the operation of the processor 180 of the example embodiment may be, for example, an up/down index, an extremum index, a precedence prediction index, etc. The up/down index uses increase or decrease of change in the values of the factor, whereas the extremum index uses an extremum, that is, a point at which the values that are represented by the obtained information change in time series from increase to decrease or vice versa. In the case of the precedence prediction index, a difference between an actual point and a point which is predicted at a time preceding the predicted point is used. Each index will be described in detail elsewhere herein. The index may not only be a conventional index, but may also be set to include an item which is preferred by a user, which is not limited thereto.

The processor 180 outputs information related to the predicted value of the prediction object based on the values of the identified at least one factor (operation S330).

The processor 180 may identify the at least one factor which corresponds to the time series change of the reference values based on each of the indexes, and output the information related to the predicted value of the prediction object based on the values of the identified factor.

According to an embodiment, because the time series change is used to calculate the value of the prediction object, it is possible to prevent the prediction of a result which is different from an actual value due to selection of a non-optimal factor, and to reduce a cost by finding a combination of optimal factors.

Figure 4:
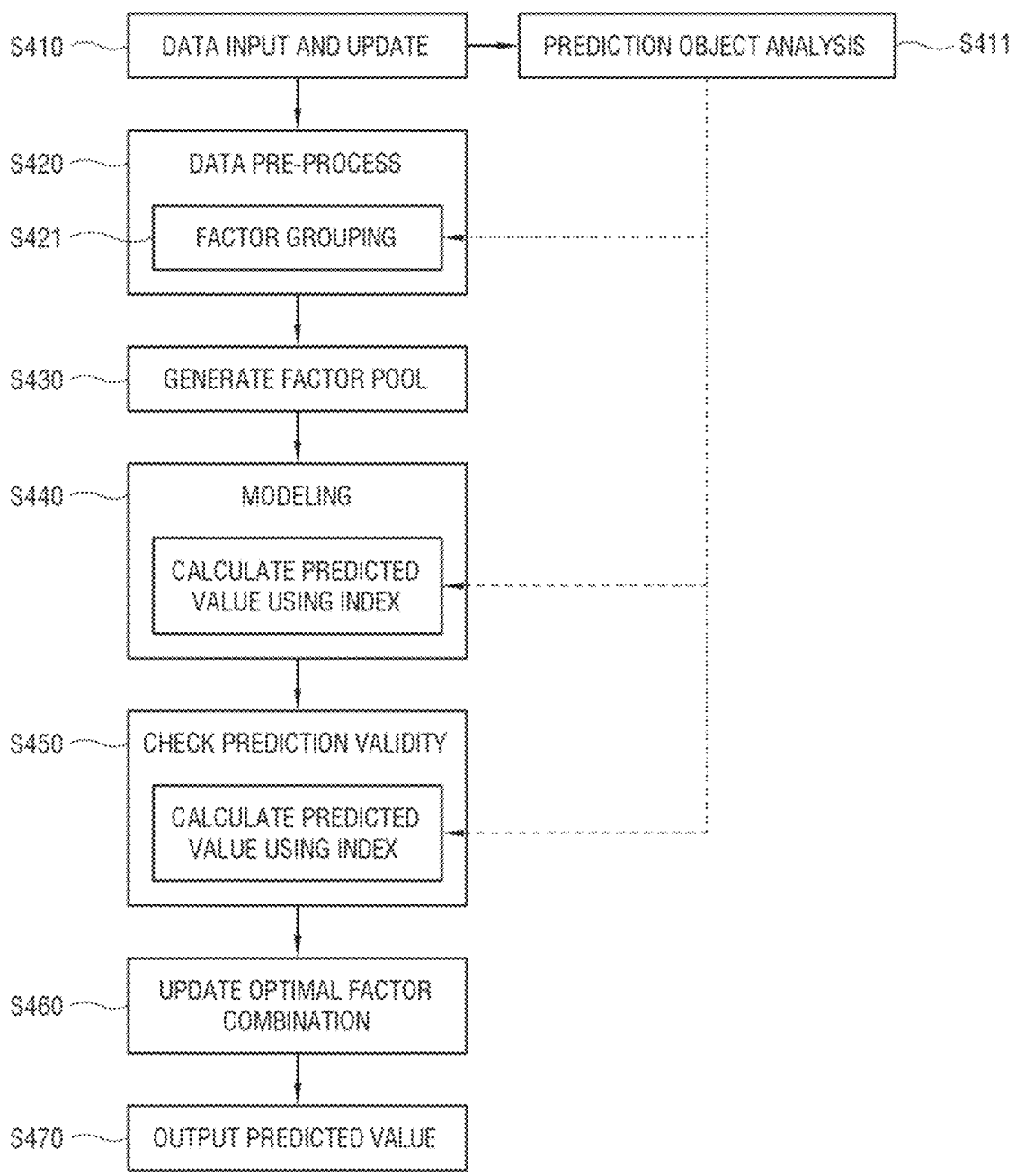
FIG. 4 illustrates a flow of operations of the electronic apparatus according to an example embodiment.

FIG. 4 illustrates a flow of operations of the electronic apparatus 100 according to an embodiment. FIG. 4 illustrates the flowchart of FIG. 3 more specifically, but does not limit the embodiment of FIG. 3.

The processor 180 obtains and inputs data to extract the factor relating to the prediction object (operation S410). As described in operation S310 of FIG. 310, the processor 180 may receive data via the interface 110 or use data which stored in the storage 140. The processor 180 analyzes the obtained data based on the prediction object (operation S411). The process of analyzing the obtained data may be used for a data pre-process which includes grouping the related factors, may be used to determine the accuracy index in modeling, or may be used to determine a priority in checking validity.

The processor 180 selects the plurality of factors through pre-processing the obtained data (operation S420). The processor 180 may generate a factor pool which includes the factors used for a model ahead of modeling to calculate the predicted value of the prediction object. In order to generate the factor pool, first, the data pre-process is performed on all the input data. Next, the feature of the prediction object is checked through an analysis of the prediction object, and a group or cluster is composed mainly of the prediction object.

That is, the data pre-processing includes grouping or clustering of the factors (operation S421). The processor 180 may group the plurality of factors into a plurality of groups which are different from one another based on a relation to the prediction object (operation S421). As a method of grouping, for example, similar to FIG. 5, the processor 180 gives the plurality of factors coordinates according to the relation, and groups each of the factors whose given coordinates are similar. The processor 180 may generate the group from the data and the extracted factors based on a prediction object-oriented keyword.

The pre-processing of time series data unlimitedly includes a technique to process the time series data suitably for a usable purpose. The technique may be data extraction and standardization to make different types of data into a uniform type of data usable for a prediction model, conversion for unit concordance among data such as time, amount, etc., a statistic technique regarding a representative value of data, factor modification and enhancement on pre-processed data, etc. Specifically, the technique may be converting, in the case of having to use monthly data, quarterly data into the monthly data through linear interpolation, obtaining the factor by generating a representative value through averaging values whose sources are different, factor modification and enhancement such as generating a margin factor with a price and cost or generating an oversupply index or glut ratio with data of demand, supply, stock, etc. Such data pre-processing may be provided by a model or program which is prepared to learn in advance.

The processor 180 generates a main factor pool from the generated plurality of groups in consideration of the relation to the prediction object, and representativeness of each of the groups (operation S430). As a result of the grouping, factors which have a high probability to be selected as the factor pool are the factors which highly relate to the prediction object and have high representativeness in each group. The process of grouping is able to prevent multicollinearity by securing the factors which relate to the prediction object while reducing correlation between other factors. According to this, the explanatory power of a final model can be enforced.

In the case of using a model in an actual domain, a requisite factor is selected for the explanatory power of the model. The requisite factor may be included when composing various factor combinations for prediction, whereas any combination with a factor which is not requisite may also be considered.

The processor 180 generates a model which uses the accuracy index to select the optimal factor from the factor pool which is previously generated by pre-processing the data (operation S440). As described above, the accuracy index may be an up/down index, an extremum index, and an precedence prediction index. The three indexes will be described with reference to FIGS. 7 through 10.

The processor 180 checks the validity of the predicted value which is calculated using the generated model (operation S450). In this operation, the processor 180 does not only compare the indexes, but also defines and evaluates a normal category of the time series predicted values in a predicted interval based on a past pattern of the prediction object. The normal category of the prediction object may include an upper/lower limit, a changing range, a changing frequency, etc.

For example, in the case of prediction based on the extremum index, an upper limit of a number of extrema which may occur in the predicted interval is set. The processor 180 may not select a factor combination where the number of extrema of the predicted values exceeds the set upper limit.

In order to respond flexibly in modeling the time series values having various features, priority how to apply the accuracy indexes and the validity check changes variably based on feature analysis of the prediction object. For example, when there is a trend but a change is small, the processor 180 may prioritize the extremum index and the validity check associated with the change because the change affects as a risk element. In contrast, when the change is large, the processor 180 may prioritize the up/down index because of a seasonal or periodic change.

The processor 180 may perform the operations of S440 and S450 with respect to all of the factor combinations which can be generated in the factor pool, and finally perform prediction based on a model which uses a highest index satisfying the prediction validity.

The processor 180 checks the validity, selects an optimal factor combination from among the factor combinations in a basis of the plurality of models, and updates data (operation S460).

The processor 180 measures a degree of the prediction validity of a predicted result value regarding a factor-and-machine learning model combination which show a high time series index value for a validation data set among predicted models which have learned based on learning data sets. The processor 180 generates a final predicted model by selecting a factor-and-machine learning model combination which satisfies the prediction validity most. Here, if there is no factor-and-machine learning model combination which satisfies the prediction validity, the processor 180 may generate at least one predicted model by gradually alleviating a condition of the prediction validity, supplementing factor data, etc.

The processor 180 outputs information on the predicted value of the prediction object based on a value of the selected optimal factor combination (operation S470).

According to an embodiment, it is possible to calculate and provide a validated predicted value in which the time series change of the prediction object is considered. According to an embodiment, it is also possible to calculate a more accurate predicted value by setting the index adaptively in accordance with the prediction object and modeling based on the factors highly relating to the prediction object.

Figure 5:
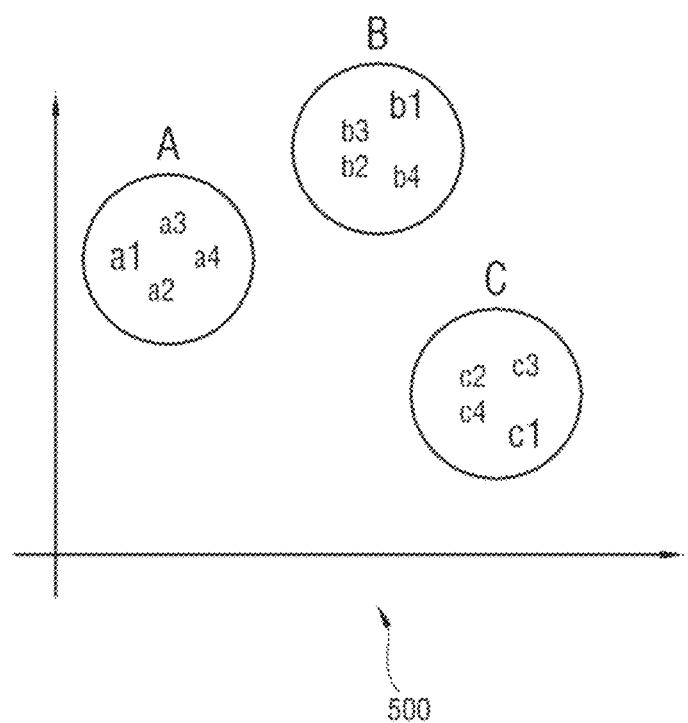
FIG. 5 illustrates a graph in which a plurality of factors are grouped according to an example embodiment.

FIG. 5 illustrates a graph in which a plurality of factors are grouped according to an embodiment.

The graph 500 shows that, in the operation S421 of FIG. 4, the plurality of factors are grouped into a plurality of groups which are different from one another based on the relation to the prediction object.

The processor 180 groups the plurality of factors into the plurality of groups which are different from one another based on the relation to the prediction object, and identifies a factor which corresponds to a change of the reference values based on a change of the factors which are included in each of the groups.

More specifically, first, the processor 180 searches a related factor based on a prediction object-oriented keyword among data which can be obtained. For example, when the prediction object is a panel price, words such as "panel," "price," "demand of panel," etc., may be searched.

Next, the processor 180 gives the plurality of factors, which are obtained by the search, a coordinate in accordance with the relation like the graph 500, and groups each of the factors whose given coordinates are similar. For example, the factors obtained by the search word, whose relation is high, such as "demand of 24-inch panel," "demand of 32-inch panel," "demand of 40-inch panel," etc., are given a similar coordinate, and have high probability to be within a same group when being grouped.

Accordingly, as illustrated in FIG. 5, the factors a1, a2, a3, and a4 whose coordinates are similar are grouped as group A, the factors b1, b2, b3 and b4 are grouped as group B, and the factors c1, c2, c3 and c4 are grouped as group C.

The processor 180 identifies a factor which corresponds to the change of the reference values based on a value of the factor which has representativeness in each of the groups. The process of grouping is able to prevent multicollinearity by securing the factors which relate to the prediction object while reducing correlation between other factors. For example, if the factors a1, a2, a3, and a4 in the group A are all used to predict a value, the accuracy of prediction may be affected because of high correlation between the factors. Therefore, it is possible to determine whether the relation between the factors included in the group A is high and select the factor a1, which has representativeness among the group, as a representative factor. Described using the above example, because "demand of 24-inch panel," "demand of 32-inch panel," "demand of 40-inch panel," etc., which is included in a same group, has a high probability to affect "price of panel" prediction redundantly, which affects the accuracy of the prediction, a factor having the representativeness may be set as the representative factor. In this way, it is possible to enforce the explanatory power of the final model.

The processor 180 identifies whether a change of the values, which are in accordance with the combination of the plurality of factors selected from the plurality of group, corresponds to a change of the reference values. The factors which are far away from each other in the graph 500, that is, whose relation is low, may be combined. This has a same purpose as selecting the representative factor as described above. When the factors which are far away from each other are combined, the probability to select factors which are different in the group is high. Also, when the factors which are present in the groups that are different from each other are combined, the reliability of prediction is higher than selecting the factors which are present in the same groups.

Therefore, according to an embodiment, processor 180 repeatedly selects the optimal factor combination among a large number of factor combinations using the plurality of groups, thereby efficiently minimizing the process of selection by using the combination of the factors between which the distance is far. Accordingly, it is efficient to preferentially select the combination where the distance is far.

In FIG. 5, for example, a change of values in accordance with a combination of a1 of the group A, b1 of the group B, and c1 of the group C may be identified whether to correspond to the change of the reference values.

According to an embodiment, it is possible to prevent multicollinearity which may occur when using a number of factors through grouping and extracting factors.

Figure 6:
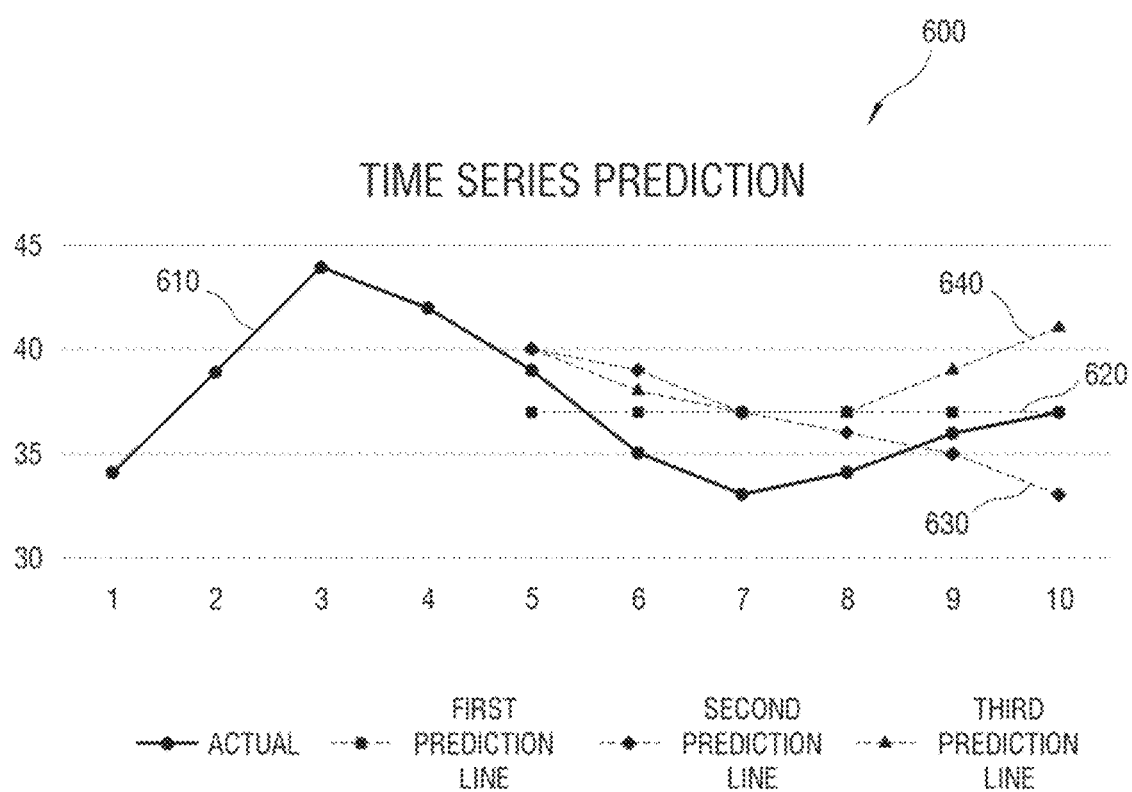
FIG. 6 illustrates graphs which include time series prediction according to an example embodiment.

FIG. 6 illustrates graphs which include time series prediction according to an embodiment.

The graph 600 shows actual values and values which are predicted in three different methods according to an embodiment. A horizontal axis of the graph 600 represents time such as, for example, months, while a vertical axis represents the actual values and the predicted values of the prediction object. It is supposed that the graph 600 illustrates the values predicted by various methods in consideration of the actual values from January to April. The actual values from January to October are represented as a value line 610. Referring to the predicted values other than the actual values, there are illustrated a first prediction line 620 which maintains at an average value of the actual values from January to April, a second prediction line 630 which is predicted by comparing the actual values and values of at least one factor relating to the prediction object, and a third prediction line 640 where a change of the values is predicted by using the accuracy index in accordance with an embodiment.

Because the second prediction line 630 analyzes values themselves based on a difference between the predicted value and the actual value, a ratio, etc., the time series change such as an extremum is not considered. For example, if the relation between the factors is not considered due to predicting a panel price based on a past stock of panels, an economy index, etc., a predicted model which has less actual in time series prediction issues may be generated. Also, a predicted result may be significantly affected, because a factor which is not actually related is selected, for example, a shoe price is considered in measuring the panel price.

However, according to an embodiment, the third prediction line 640 groups the plurality of factors, and predicts the time series change of the factors using various accuracy indexes through combining the factors which have the representativeness in each of the groups. Here, because an optimal factor is adopted by modeling the selected factors into various combinations, the value can be actual and more accurate than predicting based on a same value or a difference between values.

Referring to the values in FIG. 6 predicted from May to October, the second prediction line 630 and the third prediction line 640 of May are more similar to the actual value of May than the first prediction line 620, while the first prediction line 620 of June is more similar to the actual value of June than the second prediction line 630 and the third prediction line 640. In this way, the prediction line which has the predicted value that is mot similar to the actual is different for each month. However, considering in view of time series, it can be understood that a pattern of the third prediction line 640 shows the most similarity to that of the value line 610 of the actual value.

That is, according to an embodiment of the disclosure, because the accuracy index reflects the time series change of the values as described with FIGS. 3 to 5, it can be understood that the change pattern of the values which are calculated based on the accuracy index has a similar result to that of the actual values.

Figure 7:
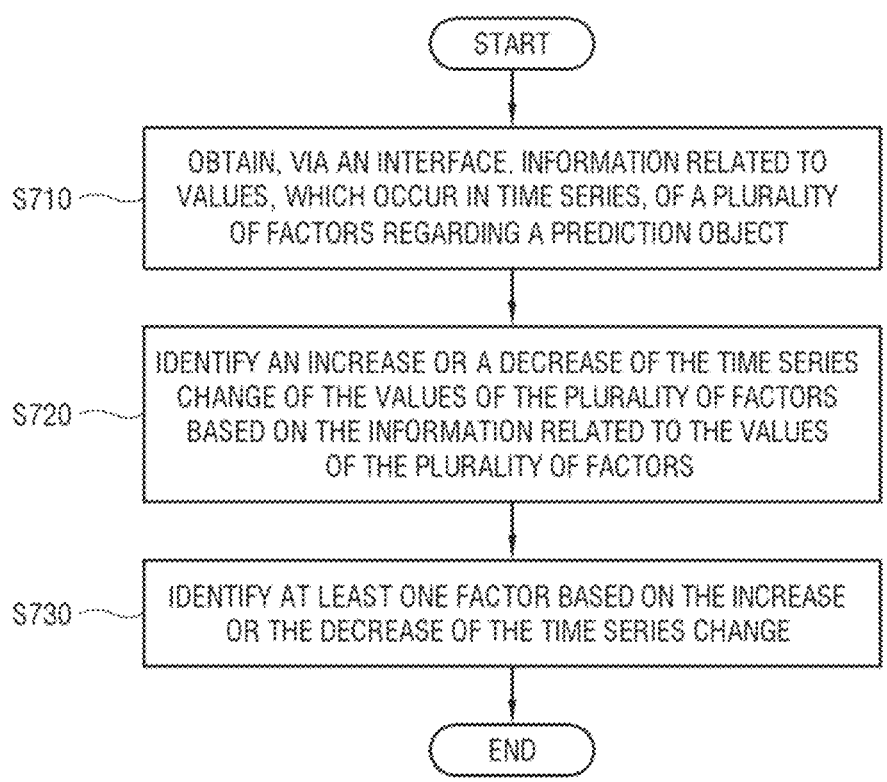
FIG. 7 illustrates a flowchart of the electronic apparatus based on the up/down index according to an example embodiment.

FIG. 7 illustrates a flowchart of the electronic apparatus based on the up/down index according to an embodiment.

The up/down index allows for identification of a factor which corresponds to the change of the reference values using increase or decrease of the values of the plurality of factors. The processor 180 obtains information related to the values, which occur in time series, of the plurality of factors regarding the prediction object (operation S710), and identifies increase or decrease of change for the values of the plurality of factors based on the obtained information (operation S720). For the identification of the increase or decrease of change, processor 180 may use Formulas 1 and 2 used below.

The up/down index uses F1 score which evaluates a categorical prediction such as Formula 1 to measure n−1 increases or decreases which occur among n values that are predicted. After making confusion matrixes or error matrixes which consider 'UP' and 'DOWN' as 'POSITIVE', respectively, and obtaining two F1 scores using Formula 1, a number of cases of 'UP' and 'DOWN' is obtained with a weighted average using Formula 2.

$$(F1\ score) = \frac{2 \cdot precision \cdot recall}{precision + recall} \quad \text{[Formula 1]}$$

(Up/Down Index) = [Formula 2]
$(UP_{tot} \cdot UP_{F1} + DOWN_{tot} \cdot DOWN_{F1}) / (UP_{tot} + DOWN_{tot})$ The processor 180 identifies the factor which corresponds to the change of the reference values based on the change that is identified using the above formulas (operation S730).

According to an embodiment, it is possible to know an interaction effect between individual factors, which would be missed if only a relation index between an individual factor and a corresponding value had been calculated.

Figure 8:
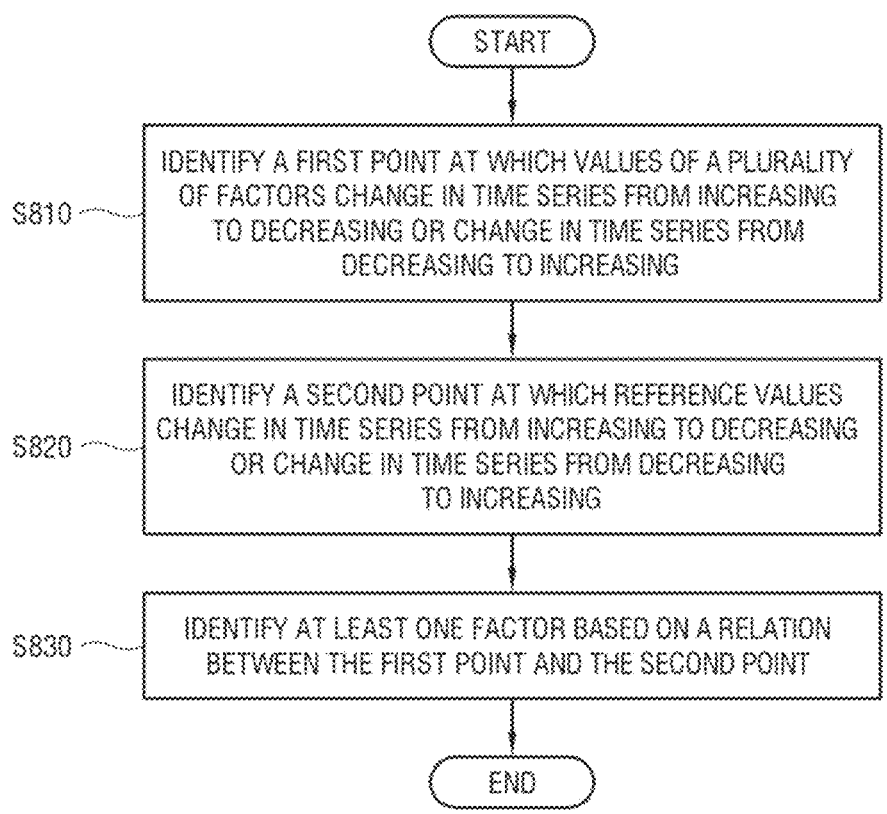
FIG. 8 illustrates a flowchart of the electronic apparatus based on the extremum index according to an example embodiment.

FIG. 8 illustrates a flowchart of the electronic apparatus 100 based on the extremum index according to an embodiment.

The extremum index uses a point, that is, an extremum at which values change in time series from increase to decrease or vice versa. The extremum includes a maximum point and a minimum point, and is a point at which increase or decrease of change happens in time series.

The process to identify an optimal factor based on a change at the extremum is as follows.

The processor 180 identifies a point (referred to as "first point" or "first extremum") at which values, which occur, change in time series from increasing to decreasing, or vice versa (operation S810). And, the processor 180 identifies another point (referred to as "second point" or "second extremum") at which the reference values change in time series from increasing to decreasing, or vice versa (operation S820). The processor 180 identifies at least one factor which corresponds to the time series change of the reference values based on a correlation between the first point and the second point (operation S830). In other words, the processor 180 identifies, as the optimal factor, a factor which has the first point close to the second point of the reference values, that is, a factor which has a pattern of the extremum similar to that of the reference values.

Additionally, in order to measure the extremum index or predict an interval during which values changes from increasing to decreasing, or vice versa, a conditional probability such as the following Formula 3 may be used.

(Extremum Index) = [Formula 3]
$Pr$(Extremum Prediction|Extremum Occurrence) =

$$\frac{Nmber(m: \Delta_{o_m} \cdot \Delta_{o_{m+1}} < 0, \Delta_{p_m} \cdot \Delta_{p_{m+1}} < 0, \Delta_{o_m} \cdot \Delta_{p_m} > 0)}{Nmber(m: \Delta_{o_m} \cdot \Delta_{o_{m+1}} > 0)}$$

(In Formula 3, $p_m$=predicted value in month m, $o_m$=observed value in month m, $\Delta p_m = p_m - p_{m-1}$, $\Delta o_m = o_m - o_{m-1}$)

Also, the processor 180 may not identify, as the optimal factor, the factor which has the extremum similar to that of the reference values in consideration of only the pattern of the extremum but also a number of the extrema additionally.

That is, the processor 180 may identify the at least one factor which corresponds to the time series change of the reference values based on a number relation between the first points and the second points using Formula 3.

Here, such conditional probability may be used because a case in which too many extrema occur in checking the prediction validity of the operation S450 of FIG. 4 as described above is filtered.

According to an embodiment, in prediction using the time series change in which a trend of the value change of each factor is applied, it is possible to make the predicted value in accordance with the pattern of actual time series by minimizing an absolute error between the predicted value and the reference value.

Figure 9:
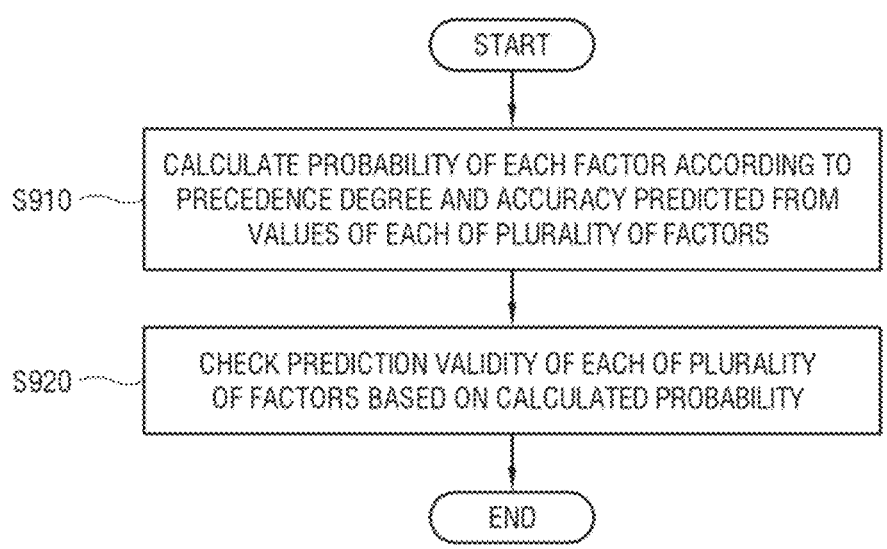
FIG. 9 illustrates a flowchart of the electronic apparatus based on the precedence prediction index according to an example embodiment.

FIG. 9 illustrates a flowchart of the electronic apparatus 100 based on the precedence prediction index according to an embodiment, and FIG. 10 illustrates a table used for the precedence prediction index.

The precedence prediction index may be used to check how usefully and accurately the predicted values forecast the change of the actual values at a time preceding an actual point. In the case that the change of the values occurs rarely and detecting the pattern in advance is important, it is also important how previously prediction occurs as well as how to predict the values.

Therefore, the processor 180 checks the prediction validity using the following two accuracy variables as the precedence prediction index. For example, the accuracy variables include a precedence degree which indicates how previously from the actual point to predict and an accuracy which indicates how accurately to predict the change of the actual values.

That is, the processor 180 calculates probability of each factor in accordance with the precedence degree and the accuracy which are predicted from the values of each factor (operation S910). Next, the processor 180 checks the prediction validity of each factor based on the calculated probability (operation S920).

The table 1000 of FIG. 10 illustrates performance of a model through repeated tests in a test interval using the following Formula 4.

Referring to FIG. 10, the column represents the precedence degree, that is, a difference as a number of months between the time or point at which the prediction is performed and the actual point, whereas the row represents the accuracy, that is, a preceding/following difference as a number of months between the predicted point and the actual point. Here, the actual point may be a point at which the change of the values actually occurs, for example, the extremum, but is not limited thereto.

In the table 1000, how previously and accurately the predicted values forecast the change of the actual values may be calculated by the probability through the following Formula 4.

[Formula 4]

Probability to predict at n months ahead of time previously or subsequently by $$m\ months = \frac{X_{mn}}{\sum_{u,v} X_{uv}}$$

Precedence prediction error score=$\Sigma_{u,v} w_{uv} * X_{uv}$, (In Formula 4, $w_{nm}$=weight for precedence prediction; value lower as n becomes larger and m is closer to 0, $X_{nm}$=number of months predicted in total test at n months ahead of time previously or subsequently by m months)

Referring to FIG. 10, X_00, X_01, X_02, and X_03 represent the probabilities of predicting at times such as, for example, March, April, May, and June, which are the same as or precede an actual change point of, for example, June, where a predicted point accurately forecasts the actual change point of June. X_10, X_11, X_12, and X_13 represent the probabilities of predicting at times of, for example, February, March, April, and May, or April, May, June, and July, which are the same as or precede the actual change point of, for example, May or July within an error range of one month. X_20, X_21, X_22, and X_23 represent the probabilities of predicting at times such as, for example, January, February, March and April, or May, June, July, and August, which are the same as or precede the actual change point of, for example, April or August within an error range of two months.

A consistent determination criterion is applied for the precedence degree or the accuracy, where the more previously or accurate, the higher the prediction validity. Therefore, the factors which are used in case that the predicted probability of X_03 in FIG. 10 is high mean factors which have high prediction validity.

Accordingly, the processor 180 checks the prediction validity of each factor based on the probability of each factor which is calculated in accordance with the precedence degree and the accuracy.

It is applicable to set as the index an accuracy after a certain point in the prediction interval to evaluate the precedence prediction, prediction stability of backtesting, etc., and apply weight or consider priority in case of a number of indexes being selected.

According to an embodiment, it is possible to calculate the predicted value which is more accurate by setting the index adaptively in accordance with the prediction object and modeling based on factors which have high relation to the prediction object.

The electronic apparatus 100 and the control method thereof according to an embodiment may be embodied in a form of a recording medium which includes instructions executable by a computer such as a program module executed by the computer. The computer-readable recording medium may refer to an arbitrary usable medium which is accessible by the computer, and includes a volatile or non-volatile medium, a separate or inseparate medium, etc. Also, the computer-readable recording medium includes a computer storage medium and a communication medium. The computer storage medium includes a volatile or non-volatile, separate or inseparate medium which is embodied in a method or technology for storing information such as computer-readable instructions, data structures, program modules, or other data. The communication medium includes a transmission mechanism of computer-readable instructions, data structures, program modules, or other data of a modulated data signal such as a carrier wave, and includes an arbitrary information transmission medium.

Although a few embodiments have been shown and described, it will be appreciated by those skilled in the art that changes may be made in these embodiments without departing from the principles and spirit of the present disclosure, the scope of which is defined in the appended claims and their equivalents.

What is claimed is:

1. An electronic apparatus comprising:
an interface;
a storage; and
a processor configured to:
   identify a plurality of factors related to a prediction object by using at least one of data received via the interface or data stored in the storage,
   group the plurality of factors into a plurality of groups which are different from one another based on a relation to the prediction object,
   generate a factor pool including representative factors, which relate to the prediction object and have representativeness in each of the plurality of groups,
   through combining the representative factors of the generated factor pool, generate a plurality of models, each of which predicts a time series change of the representative factors using different accuracy index,
   identify a validity of predicted values, which are calculated using the plurality of generated models, a validity identification standard and a priority of the plurality of models related to the accuracy index in the validity identification being different according to a feature of the prediction object,
   based on the identified validity of predicted values, identify an optimal factor combination from among factor combinations of the factor pool in a basis of the plurality of models,
based on a value of the identified optimal factor combination, output information related to a predicted value of the prediction object.

2. The electronic apparatus according to claim 1, wherein the processor is configured to generate a first model to:
identify a point at which values of the plurality of factors change in time series from increasing to decreasing or change in time series from decreasing to increasing, and
identify at least one factor based on the point.

3. The electronic apparatus according to claim 2, wherein the point is a first point, and
wherein the processor is further configured to identify the at least one factor based on a relation between a number of first points and a number of second points at which reference values change in time series from increasing to decreasing or change in time series from decreasing to increasing.

4. The electronic apparatus according to claim 1, wherein the processor is configured to generate a second model to:
identify a probability of each of the plurality of factors according to a precedence degree and an accuracy which are predicted from values of the plurality of factors, and
identify a prediction validity of each of the plurality of factors based on the corresponding probability.

5. The electronic apparatus according to claim 1, wherein the processor is further configured to generate a third model to:
identify an increase or a decrease of the time series change of the plurality of factors based on information related to values of the plurality of factors, and
identify at least one factor based on the increase or the decrease of the time series change.

6. The electronic apparatus according to claim 1, wherein the processor is further configured to:
identify coordinates for each of the plurality of factors according to the relation, and group factors, from among the plurality of factors, having similar coordinates into a same group.

7. The electronic apparatus according to claim 1, wherein the processor is further configured to:
identify whether a time series change of values of a combination of factors, from among the representative factors, which are selected from the plurality of groups, corresponds to a time series change of reference values.

8. A method of controlling an electronic apparatus, the method comprising:
identifying a plurality of factors related to a prediction object by using at least one of data received via an interface of the electronic apparatus or data stored in a storage of the electronic apparatus,
grouping the plurality of factors into a plurality of groups which are different from one another based on a relation to the prediction object,
generating a factor pool including representative factors, which relate to the prediction object and have representativeness in each of the plurality of groups,
through combining the representative factors of the generated factor pool, generating a plurality of models, each of which predicts a time series change of the representative factors using a different accuracy index,
identifying a validity of predicted values, which are calculated using the plurality of generated models, a validity identification standard and a priority of the plurality of models related to the accuracy index in the validity identification being different according to a feature of the prediction object,
based on the identified validity of predicted values, identifying an optimal factor combination from among factor combinations of the factor pool in a basis of the plurality of models,
based on a value of the identified optimal factor combination, outputting information related to a predicted value of the prediction object.

9. The method according to claim 8, wherein the plurality of models comprises a first model configured to:
identify a point at which the values of the plurality of factors change in time series from increasing to decreasing or change in time series from decreasing to increasing, and
identify at least one factor based on the point.

10. The method according to claim 9, wherein the point is a first point, and
wherein the identifying of the plurality of factors comprises identifying the at least one factor based on a relation between a number of first points and a number of second points at which reference values change in time series from increasing to decreasing or change in time series from decreasing to increasing.

11. The method according to claim 8, wherein the plurality of models comprises a second model configured to:
identify a probability of each of the plurality of factors according to a precedence degree and an accuracy which are predicted from values of the plurality of factors, and
identify a prediction validity of each of the plurality of factors based on the corresponding probability.

12. The method according to claim 8, wherein the plurality of models comprises a third model configured to:
identify an increase or a decrease of the time series change of the plurality of factors based on the information related to values of the plurality of factors, and
identify at least one factor based on the increase or the decrease of the time series change.

13. The method according to claim 8, wherein the grouping the plurality of factors into the plurality of groups comprises:
identifying coordinates for each of the plurality of factors according to the relation, and
grouping factors, from among the plurality of factors, having similar coordinates into a same group.

14. The method according to claim 8, wherein the identifying the validity of predicted values comprises identifying whether a time series change of values of a combination factors, from among the representative factors, which are selected from the plurality of groups, corresponds to a time series change of reference values.

15. A non-transitory computer-readable medium storing a computer program including computer-readable code to perform a method of controlling an electronic apparatus, the method comprising:
identifying a plurality of factors related to a prediction object by using at least one of data received via an interface of the electronic apparatus or data stored in a storage of the electronic apparatus,
grouping the plurality of factors into a plurality of groups which are different from one another based on a relation to the prediction object,
generating a factor pool including representative factors, which relate to the prediction object and have representativeness in each of the plurality of groups,
through combining the representative factors of the generated factor pool, generating a plurality of models, each of which predicts a time series change of the representative factors using a different accuracy index,
identifying a validity of predicted values, which are calculated using the plurality of generated models, a validity identification standard and a priority of the plurality of models related to the accuracy index in the validity identification being different according to a feature of the prediction object,
based on the identified validity of predicted values, identifying an optimal factor combination from among factor combinations of the factor pool in a basis of the plurality of models, and
based on a value of the identified optimal factor combination, outputting information related to a predicted value of the prediction object.

* * * * *